(12) United States Patent
Shin et al.

(10) Patent No.: US 10,353,365 B2
(45) Date of Patent: Jul. 16, 2019

(54) ELECTRIC POWER FACILITIES IDENTIFICATION NUMBER GENERATION APPARATUS AND METHOD

(71) Applicant: Korea Electric Power Corporation, Naju-si, Jeollanam-do (KR)

(72) Inventors: Jin-Ho Shin, Daejeon (KR); Young-Jun Kim, Daejeon (KR); Seung-Hwan Choi, Daejeon (KR)

(73) Assignee: Korea Electric Power Corporation, Naju-si, Jeollanam-do (KR)

( * ) Notice: Subject to any disclaimer, the term of this patent is extended or adjusted under 35 U.S.C. 154(b) by 259 days.

(21) Appl. No.: 15/325,945

(22) PCT Filed: Aug. 4, 2015

(86) PCT No.: PCT/KR2015/008141
§ 371 (c)(1),
(2) Date: Jan. 12, 2017

(87) PCT Pub. No.: WO2016/028014
PCT Pub. Date: Feb. 25, 2016

(65) Prior Publication Data
US 2017/0176966 A1 Jun. 22, 2017

(30) Foreign Application Priority Data
Aug. 22, 2014 (KR) .................. 10-2014-0109643

(51) Int. Cl.
*G05B 19/042* (2006.01)
*H02J 3/00* (2006.01)
(Continued)

(52) U.S. Cl.
CPC .......... *G05B 19/042* (2013.01); *G06Q 10/06* (2013.01); *G06Q 50/06* (2013.01); *H02J 3/00* (2013.01); *G05B 2219/25298* (2013.01)

(58) Field of Classification Search
None
See application file for complete search history.

(56) References Cited

U.S. PATENT DOCUMENTS

2010/0318563 A1* 12/2010 Deprun ................ H04L 63/123
707/769
2011/0004564 A1* 1/2011 Rolia ..................... G06Q 10/06
705/348
(Continued)

FOREIGN PATENT DOCUMENTS

JP       2006-014492 A    1/2006
JP       2008-084122 A    4/2008
(Continued)

OTHER PUBLICATIONS

International Search Report dated Nov. 12, 2015 issued in International Patent Application No. PCT/KR2015/008141 (with English translation).

*Primary Examiner* — Chico A Foxx
(74) *Attorney, Agent, or Firm* — Morgan, Lewis & Bockius LLP (57) ABSTRACT

Provided are an electric power facilities identification number management apparatus and method for generating and managing standard identification numbers for respective electric power facilities by connecting the standard identification numbers with existing identification numbers that are differently set for each operating system. The apparatus generates a standard identification number for an electric power facility associated with an operating system when an existing identification number of the electric power facility is a non-standard identification number, generates a control command for collection of the standard identification number generated and collects the standard identification number
(Continued)

generated on the basis of the control command generated, verifies the collected standard identification number.

20 Claims, 7 Drawing Sheets

(51) Int. Cl.
*G06Q 50/06* (2012.01)
*G06Q 10/06* (2012.01)

(56) References Cited

U.S. PATENT DOCUMENTS

| | | | | |
|---|---|---|---|---|
| 2012/0275575 | A1* | 11/2012 | Knight | H04M 3/2245 379/32.04 |
| 2012/0310423 | A1* | 12/2012 | Taft | G06Q 50/06 700/286 |
| 2013/0091258 | A1* | 4/2013 | Shaffer | H02J 3/00 709/221 |
| 2013/0204847 | A1* | 8/2013 | Murayama | H02J 3/00 707/691 |
| 2013/0282189 | A1* | 10/2013 | Stoupis | H02J 3/00 700/286 |
| 2015/0120270 | A1* | 4/2015 | Hwang | G06Q 50/06 703/18 |
| 2016/0252890 | A1* | 9/2016 | Han | G06Q 10/06 700/295 |

FOREIGN PATENT DOCUMENTS

| | | |
|---|---|---|
| JP | 2009-211119 A | 9/2009 |
| JP | 2014-093809 A | 5/2014 |
| KR | 10-2010-0109749 A | 10/2010 |
| KR | 10-1120953 B1 | 3/2012 |

\* cited by examiner


ELECTRIC POWER FACILITIES IDENTIFICATION NUMBER GENERATION APPARATUS AND METHOD

TECHNICAL FIELD

The present invention relates to an electric power facilities identification number management apparatus and method. More particularly, the present invention relates to an electric power facilities identification number management apparatus and method for managing identification numbers of electric power facilities in an electrical power system.

This application claims the benefit of Korean Application No. 10-2014-0109643 filed Aug. 22, 2014, which is incorporated herein by reference.

BACKGROUND ART

An electric power system is a network of electrical components in which power stations, substations, and loads are connected to homes or industries (electric power consumers) via a power cable. That is, an electric power system is a network that connects from power generation to power consumption. An electrical power system is divided into transmission systems, substation systems, and distribution systems, each of which has its operating system that manages and operates electric power facilities therein.

The operating systems are divided into a system operating system for managing electric power facilities in its own system and an integrated operating system for managing overall operation of the whole electric power system.

Conventionally, identification numbers of electric power facilities used in one operating system differ from those used in other operating systems. Therefore, facility information of the electric power facilities also differs for each operating system. This makes management and operation of electric power facilities unreliable and leads to troubles in asset management. In compliance with the recent trend of big data usage, studies on comprehensive analysis on collective data in a company have been conducted to recognize the potential value of the company and find new business opportunities. However, there is a problem that each operating system uses different identification systems to identify electric power facilities. For this reason, when building a big data analysis system, it is difficult to associate operating systems with each other and analyze relationships between associated data.

In addition, since each individual operating system allocates its own identification numbers to electric power facilities according to different identification systems, when one individual operating system changes an identification number of an electric power facility, an integrated operating system that manages all operating systems encounters computing errors or data inconsistency. Therefore, reliability of a database is deteriorated and other potential problems are likely to occur in dealing with data for management of electric power facilities.

DISCLOSURE

Technical Problem

Accordingly, the present invention has been made keeping in mind the above problems occurring in the prior art, and an object of the present invention is to provide an electric power facilities identification number management apparatus and method for generating standard identification numbers for respective electric power facilities and managing the electric power facilities by connecting existing identification numbers of electric power facilities in each individual operating system with the generated standard identification numbers.

Technical Solution

In order to accomplish the objects of the present invention, according to one aspect of the present invention, there is provided an electric power facilities identification number management apparatus including: an identification number generation unit that generates a standard identification number for an electric power facility associated with an operating system thereof when an existing identification number of the electric power facility is a non-standard identification number; a system management unit that generates a control command for collection of the standard identification number generated by the identification number generation unit; and a service execution unit that collects the standard identification number generated by the identification number generation unit on the basis of the control command generated by the system management unit, verifies the collected standard identification number, and transmits the verified standard identification number to the system management unit.

The identification number generation unit includes: a detection module that monitors a database of an operating system to detect an electric power facility that is actually in use and retrieves facility information of the electric power facility detected through the monitoring of the database; a conversion module that converts a data format of the facility information detected by the detection module into Unified Architecture (UA) format when the facility information is CIM-based data, and detects an identification number from the format-converted facility information; an identification number generation module that generates a standard identification number using a pseudorandom number generation method when the identification number detected by the conversion module is a non-standard identification number; and an identification number management module that stores the standard identification number generated by the identification number generation module and the identification number detected by the conversion module, by connecting the generated standard identification number with the detected identification number, and transmits the stored standard identification number to the service execution unit when receiving a collection request for the generated standard identification number.

When receiving a change request containing a standard identification number that is erroneous and an alternative standard identification number from the service execution unit, the identification number management module retrieves a standard identification number that is the same as the erroneous standard identification number contained in the change request from among stored standard identification numbers and replaces the retrieved standard identification number with the alternative standard identification number.

The identification number generation unit includes: an identification number reference module that stores environment setting information containing a standard identification number, a transmission period, and a profile; and a service management module that transmits a standard identification number to an operating system that wants to subscribe to the standard identification number, on the basis of the environment setting information stored in the identification number reference module.

The system management unit may include: an identification number collection module that collects a standard identification number by transmitting a control command for collection of a standard identification number to the service execution unit; and a meta data storage module that stores the standard identification number collected by the identification number collection module.

The identification number collection module receives a standard identification number and an existing identification number mapped on the standard identification number from the service execution unit, and the meta data storage module stores the existing identification number and the standard identification number such that the existing identification number is connected with the standard identification number.

The service execution unit may include a connection configuration module that investigates association, aggregation, and composition of the standard identification numbers received from the identification number generation units, generates a class diagram on the basis of the investigation results, determines whether the received standard identification numbers are suspected of being erroneous; and an error verification module that performs verification, estimation, and reassignment of the standard identification numbers suspected of being erroneous.

The connection configuration module may determine that the standard identification numbers are suspected of being erroneous when two or more standard identification numbers are allocated to one electric power facility, generates a list of the standard identification numbers suspected of being erroneous, and transmits the list to the error verification module.

The error verification module may compare standard identification numbers stored in the system management unit and standard identification numbers stored relevant operating systems and checks duplication of the standard identification numbers to determine whether the standard identification numbers are erroneous.

The error verification module may select a standard identification number to be changed from among the standard identification numbers that are determined to be suspected of being erroneous by the connection configuration module, determine a time to change the standard identification number according to characteristics of the operating system in which the to-be-changed standard identification number is stored, ask the identification number generation unit to change the standard identification generation unit, and transmit a change request containing the to-be-changed standard identification number and an alternative standard identification number to the identification number generation unit.

In order to accomplish the objects of the present invention, according to another aspect of the present invention, there is provided an electric power facilities identification number management method including the steps of: by an identification number generation unit, generating a standard identification number for an electric power facility associated with an operating system when an existing identification number of the electric power facility is a non-standard identification number; by a system management unit, generating a control command for collection of the generated standard identification number; and by a service execution, collecting the standard identification number from the identification number generation unit on the basis of the generated control command, and transmitting a verified standard identification number to the system management unit.

The step of generating of a standard identification number may include the sub-steps of: by the identification number generation unit, monitoring a database of an operating system associated with an electric power facility to be managed; by the identification number generation unit, retrieving facility information of an electric power facility that is actually in use on the basis of the monitored database log; by the identification number generation unit, verifying whether an identification number detected from the facility information is a standard identification number; by the identification number generation unit, generating a standard identification number using a pseudorandom number generation method when the detected identification number is a non-standard identification number; and by the identification number generation unit, storing the generated standard identification number.

The step of verifying whether an identification number is a standard identification number may include the sub-steps of: by the identification number generation unit, converting a data format of the facility information to Unified Architecture (UA) format when the facility information is CIM-based data; by the identification number generation unit, detecting an identification number from the format-converted facility information; and by the identification number generation unit, verifying whether the detected identification number is a standard identification number that is used in CIM.

In the step of storing the generated standard identification number, the identification number generation unit stores an identification number that is determined to be a standard identification number in the step of verifying whether an identification number is a standard identification number.

In the step of storing the generated standard identification number, the identification number generation unit stores the detected identification number and the generated standard identification number such that the detected identification number and the generated standard identification number are connected with each other.

The step of transmitting a standard identification number to the system management unit may include the sub-steps of: by the service execution unit, distributing standard identification number collection requests to the identification number generation units on the basis of the generated control commands; by the service execution unit, determining whether the standard identification number received from the identification number generation unit is suspected of being erroneous; by the service execution unit, replacing the standard identification number that is suspected of being erroneous, which is determined in the step of determining whether a standard identification number is suspected of being erroneous, with an alternative standard identification number; and by the service execution unit, transmitting a standard identification number that is determined to be normal in the step of determining whether a standard identification number is suspected of being erroneous and the alternative standard identification number that has replaced the standard identification number suspected of being erroneous to the system management unit.

The step of determining whether a standard identification number is suspected of being erroneous may include the sub-steps of: by the service execution unit, investigating association, aggregation, and composition of standard identification numbers; by the service execution unit, determining whether received standard identification numbers are suspected of being erroneous on the basis of the investigation results; and by the service execution unit, generating a class diagram of the received standard identification numbers on the basis of the investigation results of the investigation step.

In the step of determining whether a standard identification number is suspected of being erroneous, the service execution unit determines that the standard identification number is suspected of being erroneous when two or more standard identification numbers are allocated to one electric power facility.

The step of replacing a standard identification number with an alternative standard identification number may include the sub-steps of: by the service execution unit, verifying a topology configuration of the standard identification numbers that are suspected of being erroneous, which is determined in the step of determining whether a standard identification number is suspected of being erroneous; by the service execution unit, selecting a standard identification number to be changed, from a pair of duplicated standard identification numbers by performing standard information model profile analysis with respect to the standard identification numbers that are determined to be suspected of being erroneous by the service execution unit; by the service execution unit, determining a time to change the standard identification number according to characteristics of an operating system in which the selected to-be-changed standard identification number is stored; and by the service execution unit, asking the identification number generation unit in the relevant operating system to change the to-be-changed standard identification number when the time comes.

In the step of asking the change of the standard identification number, a change request containing the to-be-changed standard identification number and an alternative standard identification number is transmitted to the identification number generation unit.

Advantageous Effects

According to the present invention, the electric power facilities identification number management apparatus and method can generate standard identification numbers for respective electric power facilities and manage the standard identification numbers such that the generated standard identification numbers are connected with existing identification numbers of the electric power facilities, which are differently allocated for each operating system. Therefore, it is possible to solve the problem of inconsistency of facility information of the electric power facilities between operating systems. This results in an improvement in reliability of management of electric power facilities and operation of power systems, and leads to high efficiency in asset management.

In addition, since the electric power facilities identification number management apparatus and method generate standard identification numbers for respective electric power facilities and manage the standard identification numbers such that the generated standard identification numbers are connected with existing identification numbers of the electric power facilities, which are differently allocated for each operating system, it is possible to associate operating systems with each other and perform comprehensive analysis on electric power domains (transmissions/substations/distributions/sales and demands) and continuous linkage analysis on facilities.

In addition, since the electric power facilities identification number management apparatus and method generate standard identification numbers for respective electric power facilities and manage the standard identification numbers such that the generated standard identification numbers are connected with existing identification numbers of the electric power facilities, which are differently allocated for each operating system, it is possible to perform automatic database refining and provide non-stop service through selective generation of standard identification numbers, efficiently utilize system resources, and minimize a probability of occurrence of problems when identification numbers are changed.

BEST MODE

Hereinafter, preferred embodiments of the present invention will be described with reference to the accompanying drawings to allow those skilled in the art to easily practice the present invention. First, throughout the drawings, it should be noted that like reference numbers refer to like elements although those elements are illustrated in different drawings. In describing the present invention, descriptions of known functions and configurations that are deemed to unnecessarily obscure the gist of the present invention will be omitted below.

Figure 1:
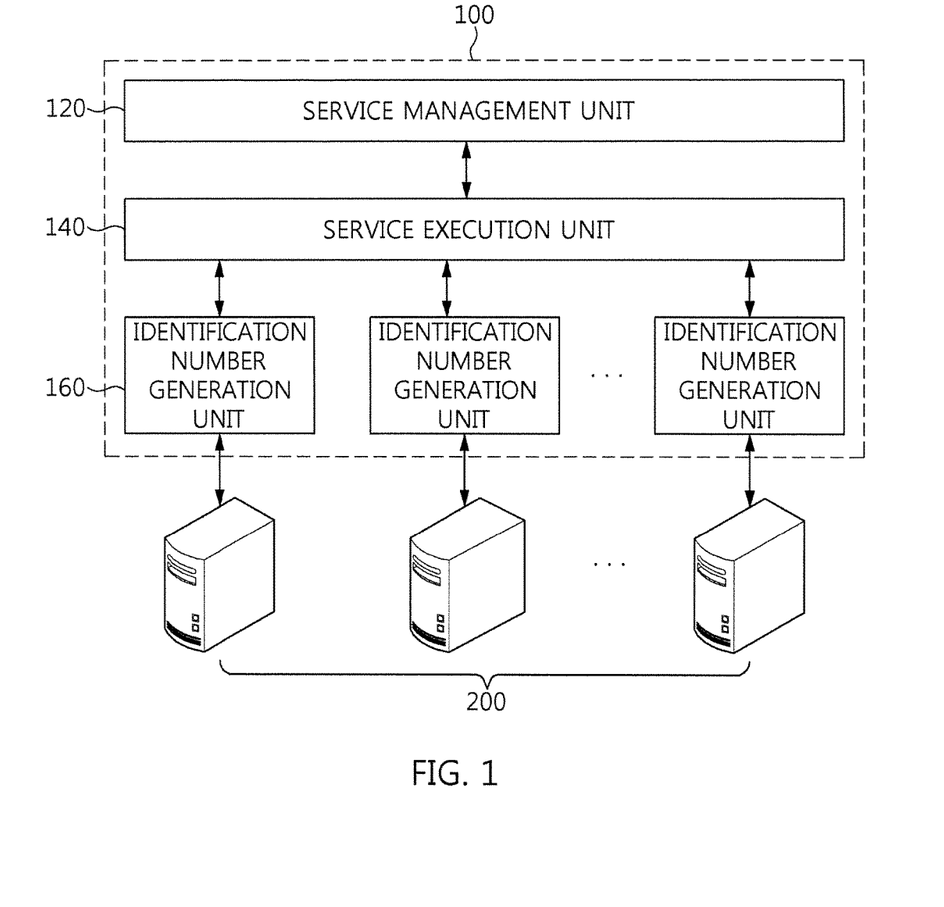
FIG. 1 is a diagram illustrating an electric power facilities identification number management apparatus according to one embodiment of the present invention.
Figure 2:
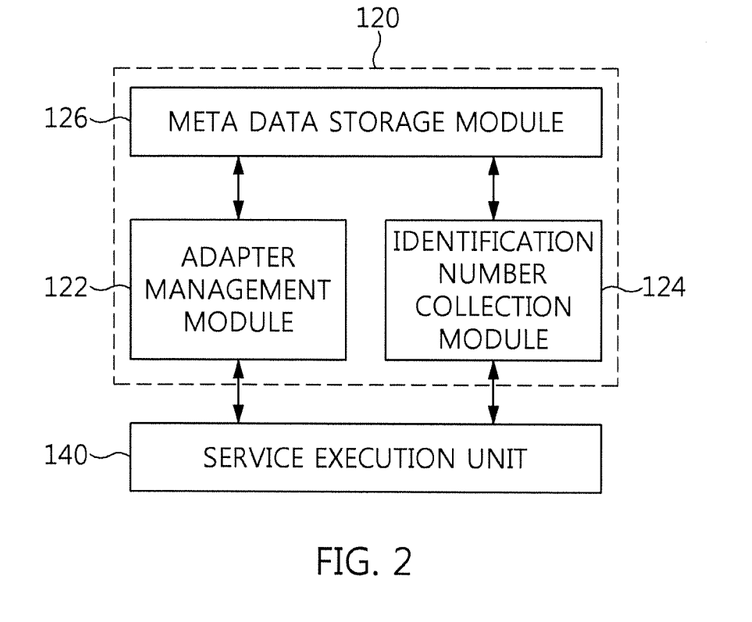
FIG. 2 is a block diagram illustrating a system management unit of FIG. 1.
Figure 3:
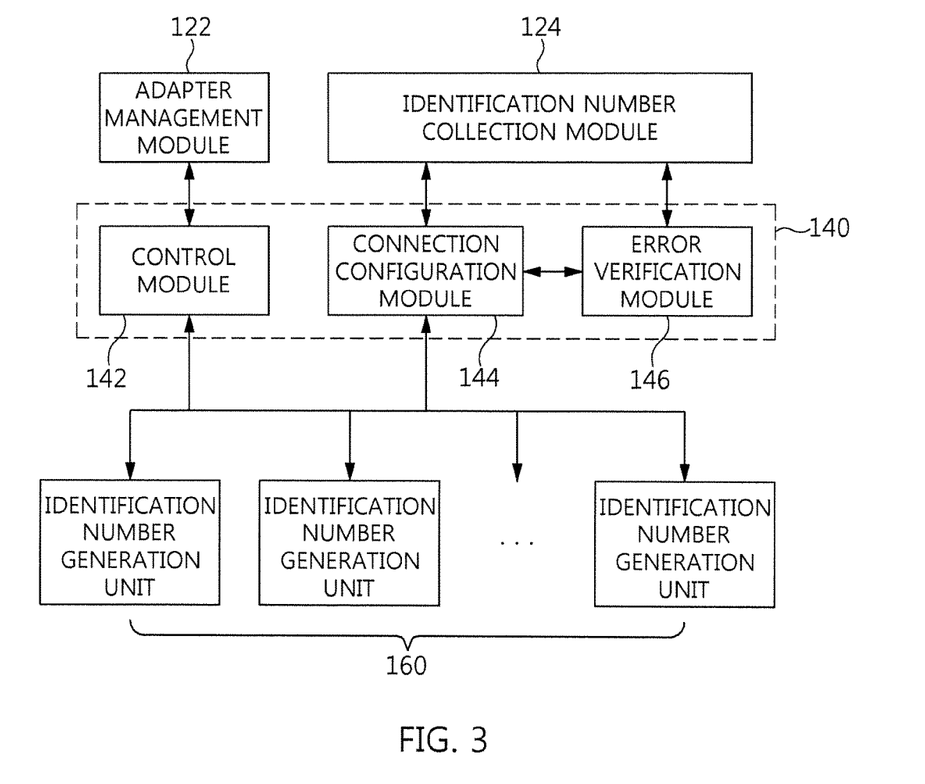
FIG. 3 is a block diagram illustrating a service execution unit of FIG. 1.
Figure 4:
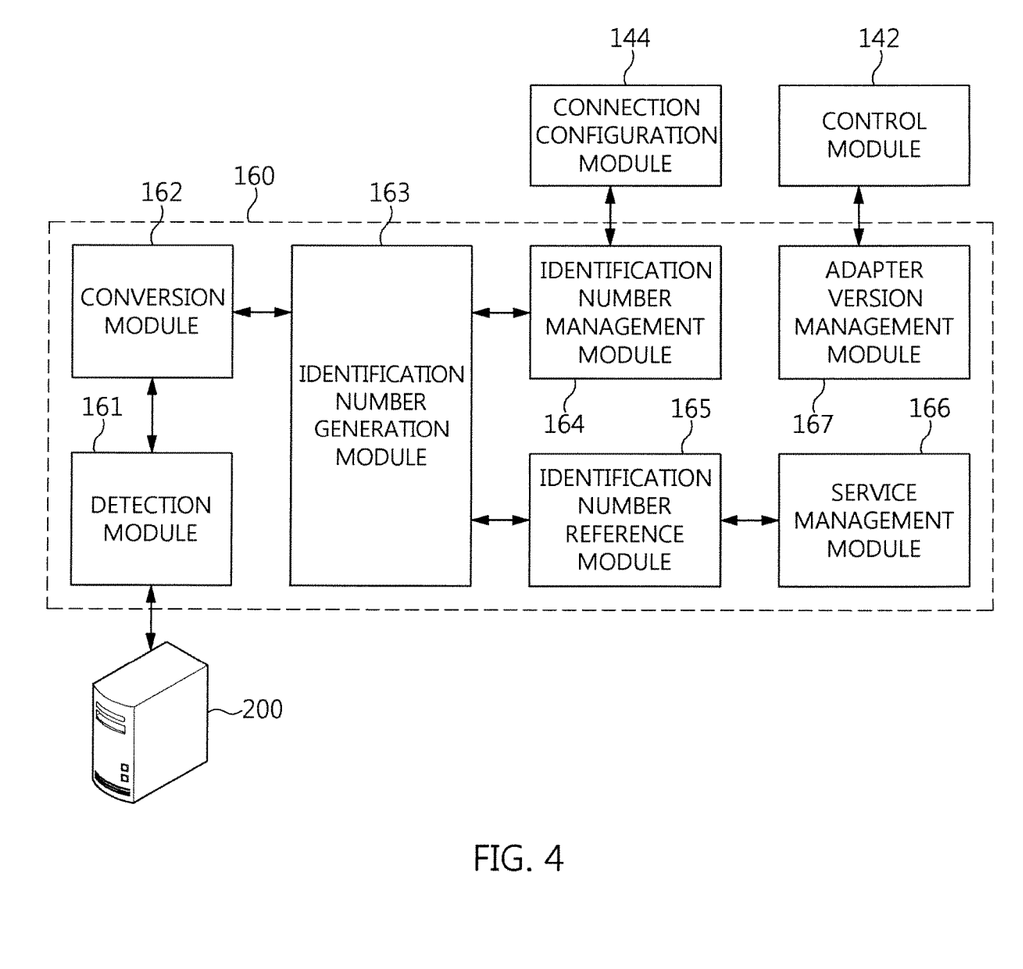
FIG. 4 is a block diagram illustrating an identification number generation unit of FIG. 1.

Hereinafter, an electric power facilities identification number management apparatus according to one embodiment of the present invention will be described in detail below with reference to the accompanying drawings. FIG. 1 is a diagram illustrating an electric power facilities identification number management apparatus according to one embodiment of the present invention. FIG. 2 is a block diagram illustrating a system management unit of FIG. 1, FIG. 3 is a block diagram illustrating a service execution unit of FIG. 1, and FIG. 4 is a block diagram illustrating an identification number generation unit of FIG. 1.

As illustrated in FIG. 1, an electric power facilities identification number management apparatus 100 includes a system management unit 120, a service execution unit 140, and an identification number generation unit 160. In this case, the system management unit 120 and the identification number generation unit 160 communicate with each other in a manner of an aggregate server pattern in which multiple identification number generation units 160 given in respective operating servers process commands distributed by a relay device (the service execution unit 140), instead of using the generally known client-server system.

The system management unit 120 functions as an aggregate client and generates a control command for collection of an identification number. The system management unit 120 generates a control command for control of the identification number generation unit 160 arranged in an operating system 200. The system management unit 120 transmits the generated control command to the service execution unit 140. The system management unit 120 stores identification numbers collected by the service execution unit 140. At this point, the system management unit 120 stores the identification number such that the standard identification numbers are connected with respective existing identification numbers. The existing identification numbers mean identification numbers of electric power facilities that have been used in the operating systems 200, and the standard identification numbers mean identification numbers of electric power facilities which are newly generated by the identification number generation units 160.

To this end, as illustrated in FIG. 2, the system management unit 120 includes an adapter management module 122, an identification number collection module 124, and a meta data storage module 126.

The adapter management unit 122 controls operation of the identification number generation unit 160 arranged in the operating system 200. That is, the adapter management module 122 generates a control command for on/off control of the identification number generation unit 160 and transmits the control command to the service execution unit 140. When the identification number generation unit 160 is provided in the form of an application program (software), the adapter management module 122 generates a control command for distribution and version management of the application program, and transmits the control command to the service execution unit 140.

The identification number collection module 124 collects the identification number generated by the identification number generation unit 160. That is, the identification number collection module 124 generates a control command for collection of an identification number and transmits the control command to the service execution unit 140. The identification number collection module 124 receives the identification number that the service execution unit 140 collects from the identification number generation unit 160. At this point, the identification number collection module 124 receives a standard identification number corresponding to an existing identification number, which is used in an operating system 200, from the service execution unit 140. The identification number collection module 124 transmits the received identification numbers (the existing identification number and the standard identification number) to the meta data storage module 126.

The meta data storage module 126 stores the identification numbers that the meta data storage module 126 has received from the identification number collection module 124. At this point, the meta data storage module 126 stores the identification numbers such that the existing identification number and the standard identification number are connected with other.

The service execution unit 140 receives a control command for control of the identification number generation unit 160 from the system management unit 120. The service execution unit 140 transmits the received control command to the identification number generation unit 160 in the relevant operating system 200, thereby controlling operation of the identification number generation unit 160. When the identification number generation unit 160 is provided as an application program (software), the service execution unit 140 may perform on/off control, distribution, and version management of the identification number generation unit 160 on the basis of the control command received from the system management unit 120.

The service execution unit 140 receives a control command for collection of an identification number from the system management unit 120. The service execution unit 140 transmits the received control command to the identification number generation unit 160 in the associated operating system 200, thereby requesting an identification number. The service execution unit 140 receives existing identification numbers and standard identification numbers from the identification number generation units 160 arranged in each operating system 200, and transmits the received identification numbers (the existing identification numbers and the standard identification numbers) to the system management unit 120.

The service execution unit 140 verifies the standard identification numbers received from the identification number generation units 160 to check for errors in the standard identification numbers. That is, the service execution unit 140 verifies whether two or more standard identification numbers are allocated to one electric power facility on the basis of the standard identification numbers received from the identification number generation units 160.

To this end, as illustrated in FIG. 3, the service execution unit 140 includes a control module 142, a connection configuration module 144, and an error verification module 146.

The control module 142 distributes the control commands received from the system management unit 120 to the identification number generation units 160 in the associated operating systems 200. That is, the control module 142 distributes the control commands for control of the identification number generation units 160 or the control commands for collection of the identification numbers, to the identification number generation units 160 arranged in the associated operating systems 200.

The connection configuration module 144 generates a class diagram on the basis of the standard identification numbers received from the identification number generation units 160. That is, the connection configuration module 144 generates a class diagram by investigating association, aggregation, and composition of the standard identification numbers before transmitting the standard identification numbers received from the identification number generation units 160 to the system management unit 120. The connection configuration module 144 generates profile information for data service (Pub.Sub) between the associated operating systems 200 by generating the class diagram.

Since the identification number generation units 160 in the respective operating systems 200 independently generate standard identification numbers, there may be an error that different standard identification numbers are allocated to an electric power facility in operating systems 200 that share a certain domain among transmissions, substations, distributions, and demands. For this reason, the connection configuration module 144 determines whether the standard identification numbers are suspected of being erroneous by checking association, aggregation, and composition of the standard identification numbers that are used to generate a class diagram. Herein, the error for the standard identification numbers is that two or more standard identification numbers are allocated to one electric power facility. The connection configuration module 144 transmits a standard identification number that is suspected of being erroneous among standard identification numbers to the error verification module 146. At this point, the connection configuration module 144 creates a list of standard identification numbers that are suspected of being erroneous and transmits the list to the error verification module 146.

The error verification module 146 performs verification, estimation, and reassignment with respect to the standard identification numbers contained in the list received from the connection configuration module 144. That is, the error verification module 146 compares the standard identification numbers stored in the system management unit 120 and the standard identification numbers stored in the relevant operating system 200, and performs verification to check whether there is duplication of the standard identification numbers.

The error verification module 146 checks a topology configuration of the standard identification numbers and selects one standard identification number to be changed from a pair of duplicated standard identification numbers through standard information model profile analysis. The error verification module 146 identifies the operating system 200 in which the to-be-changed standard identification number is stored, and determines a time at to change the standard identification number, according to characteristics of the relevant operating system 200. The error verification module 146 asks the identification number generation unit 160 in the relevant operating system 200 to change the standard identification number when the time comes. At this point, the error verification module 146 transmits an alternative standard identification number along with a change request so that the erroneous standard identification number can be replaced with the alternative standard identification number. The error verification module 146 transmits a list of standard identification numbers that have passed error verification, to the system management unit 120 when receiving a message "completion of change of standard identification number" from the identification number generation unit 160.

The identification number generation unit 160 is arranged in the operating system 200 to generate a standard identification number, according to the control command distributed by the service execution unit 140. That is, the identification number generation unit 160 generates a standard identification number, (mRID (Master Resource ID)) used in a common information model (CIM), corresponding to an existing identification number. At this point, the identification number generation unit 160 generates a standard identification number using a bottom-up selective method rather than using a batch generation method. The identification number generation unit 160 generates standard identification numbers by detecting only instances (electric power facilities) that are actually in use, from a database of the operating system 200. For this reason, this method has nearly no affect on resources of the operating system 200 and has a function of refining a database by excluding garbage data that is not in use. In addition, in a small-scale system, standard identification numbers generated by an upper-layer system can be simply applied en block using a top-down based technology. However, in a large-scale system, it is practically difficult to apply standard identification numbers en block and there is a problem that the operating system 200 that is operating has to be stopped when applying top-down based standard identification numbers. Since the identification number generation unit 160 generates bottom-up based standard identification numbers, it is possible to perform generation and error verification of standard identification numbers without stopping the operating system 200. Therefore, safe and reliable results can be obtained.

To this end, as illustrated in FIG. 4, the identification number generation unit 160 includes a detection module 161, a conversion module 162, an identification number generation module 163, an identification number management module 164, an identification number reference module 165, a service management module 166, and an adapter management module 167.

The detection module 161 periodically monitors a database log of the operating system 200 and detects an electric power facility that is actually in use. For example, when the database of the operating system 200 is built by using the Oracle Database Management System (Oracle DBMS), the detection module 106 periodically reads MView log, detects a change in data, and detects an electric power facility that is actually in use. The detection module 161 retrieves facility information of the electric power facility that is detected to be in use from the database of the operating system 200, and transmits the facility information to the conversion module 162.

The conversion module 162 converts the data format of the facility information of the electric power facility detected by the detection module 161. That is, the conversion module 162 verifies the data format of the facility information. The conversion module 162 converts the data format of the facility information into Unified Architecture (UA) format so that the facility information can be analyzed when the facility information is CIM (IEC61970/61968)-based data.

The conversion module 162 detects an identification number from the format-converted facility information. The conversion module 162 verifies whether the detected identification number is a standard identification number. The conversion module 162 transmits the detected identification number to the identification number generation module 163 and asks the identification number generation module 163 to generate a standard identification number when the detected identification number is not a standard identification number.

The identification number generation module 163 generates a standard identification number on the basis of the received identification number. That is, the identification number generation module 163 generates a standard identification number to replace the received identification number, using a pseudorandom number generation method. For example, the identification number generation module 163 selects one number from among $2^{128}$ numbers using a Globally Unique Identifier (GUID), and generates a 32-digit standard identification number.

The identification number management module 164 stores the standard identification number generated by the identification number generation module 163. At this point, the identification number management module 164 stores the generated identification number such that the existing identification number and the generated standard identification number are connected with each other. The identification number management module 164 changes the stored standard identification number when receiving a change request for change of a standard identification number from the service execution unit 140. That is, the identification number management module 164 receives the change request containing the erroneous standard identification number and an alternative standard identification number from the service execution unit 140. The identification number management module 164 retrieves a standard identification number that is the same as the erroneous standard identification number contained in the change request. The identification number management module 164 replaces the retrieved erroneous standard identification number with the alternative standard identification number contained in the change request and stores the alternative standard identification number. Through this process, the identification number management module 164 eliminates errors by editing a mapping table when errors such as duplication of standard identification numbers occur.

The identification number reference module 165 stores environment setting information for Pub/Sub service. At this point, the identification number reference module 165 stores the environment setting information including a standard identification number, a transmission period, and a profile.

The service management module 166 periodically transmits the environment setting information to the operating system 200 (for example, an upper-layer integrated analysis system, or an associated any other system) that wants to subscribe to the environment setting information, on the basis of the environment setting information stored in the identification number reference module 165.

The adapter version management module 167 makes the service execution unit 140 perform automatic upgrading when a new adapter (including the identification number generation unit 160 provided as an application program (software)) is released, on the basis of the control command transmitted from the system management unit 120.

Figure 5:
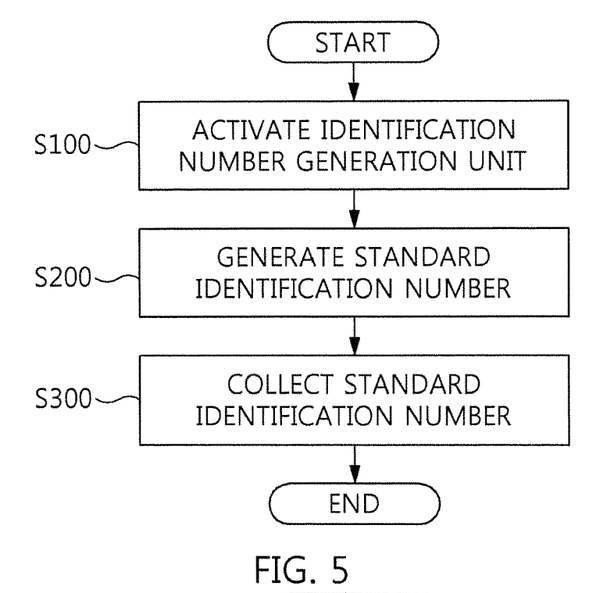
FIG. 5 is a flowchart illustrating an electric power facilities identification number management method according to one embodiment of the present invention.
Figure 6:
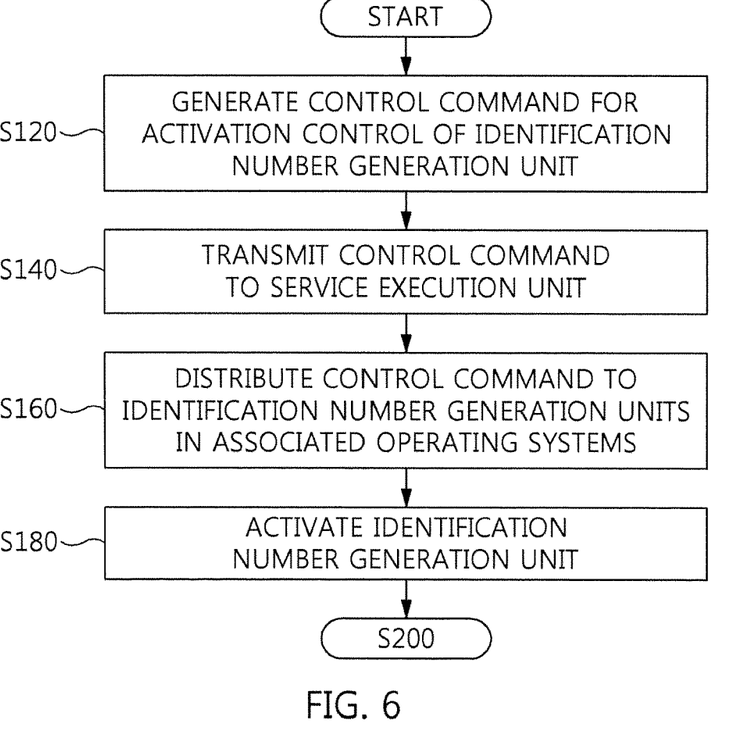
FIG. 6 is a flowchart illustrating a step of activating an identification number generation unit of FIG. 5.
Figure 7:
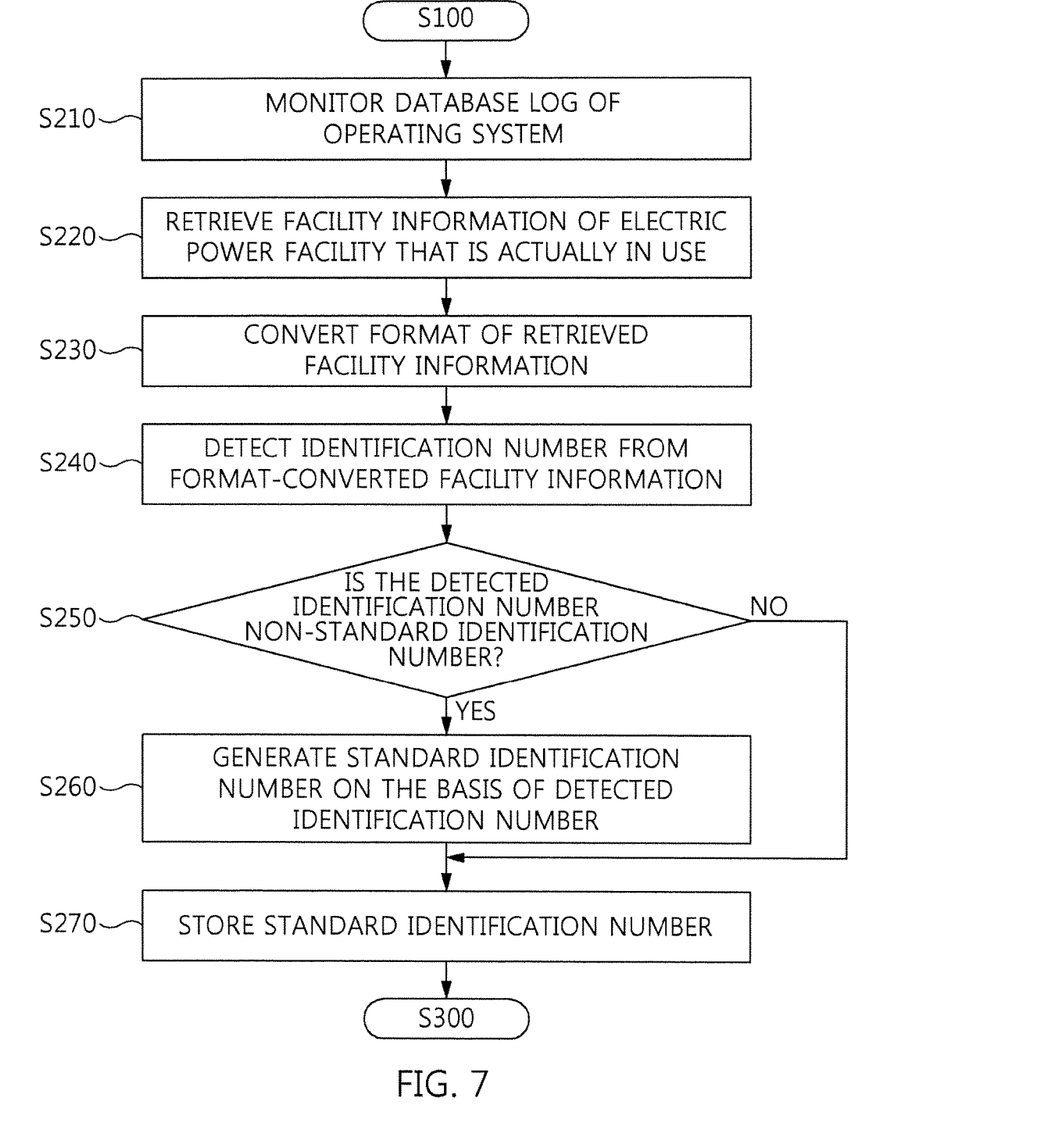
FIG. 7 is a flowchart illustrating a step of generating a standard identification number of FIG. 5.
Figure 8:
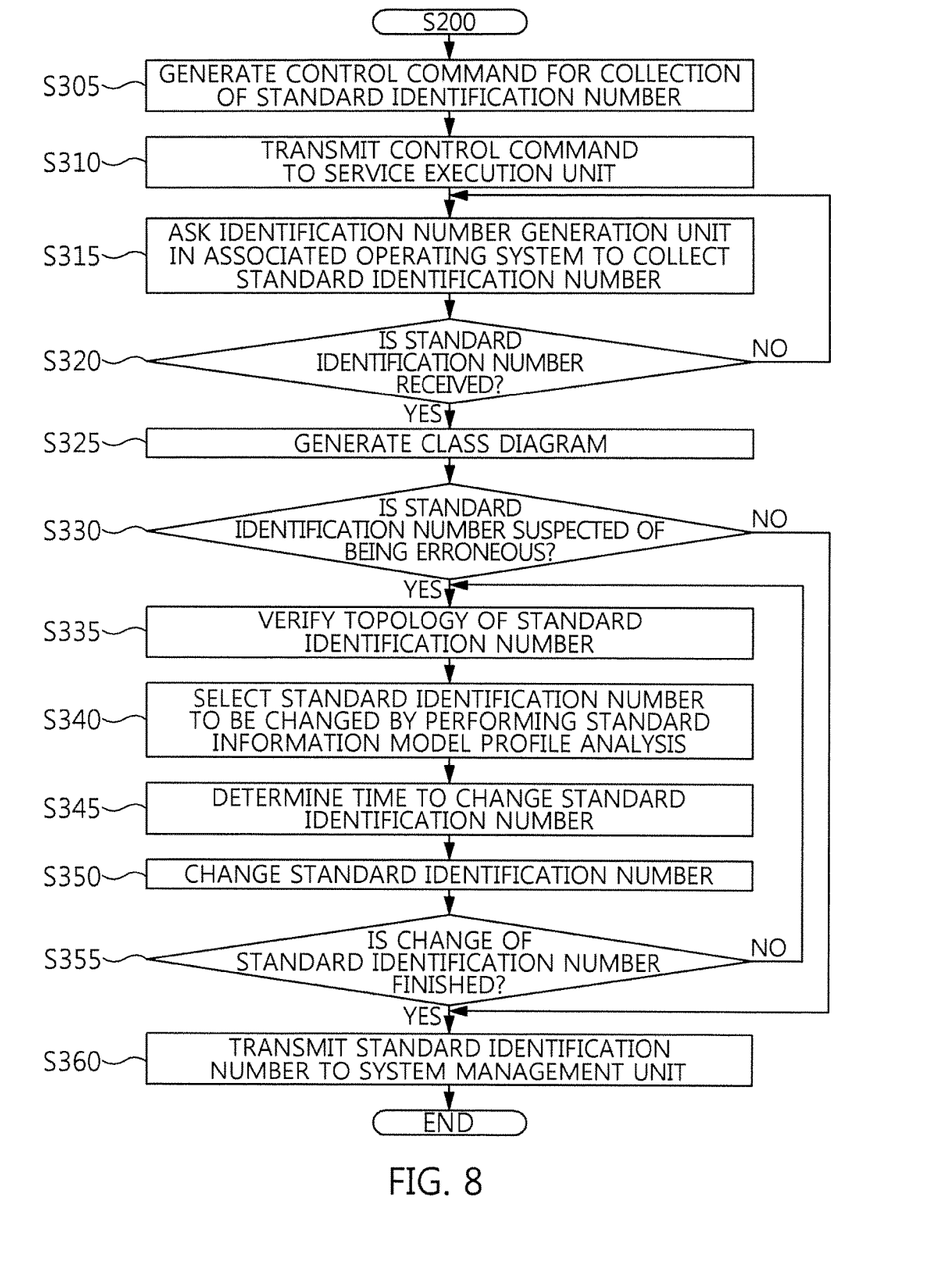
FIG. 8 is a flowchart illustrating a step of collecting a standard identification number of FIG. 5.

Hereinafter, an electric power facilities identification number management method according to one embodiment of the present invention will be described in detail with reference to the accompanying drawings. FIG. 5 is a flowchart illustrating an electric power facilities identification number management method according to one embodiment of the present invention. FIG. 6 is a flowchart illustrating a step of activating the identification number generation unit 160 of FIG. 5, FIG. 7 is a flowchart illustrating a step of generating a standard identification number of FIG. 5, and FIG. 8 is a flowchart illustrating a step of collecting an identification number of FIG. 5.

The system management unit 120 activates multiple identification number generation units 160 arranged in respective operating systems 200 (S100). This step will be described below with reference to FIG. 6.

The system management unit 120 generates a control command for activation and control of multiple identification number generation units 160 in respective operating systems 200 (S120), and transmits the control command to the service execution unit 140 (S140). The system management unit 120 generates control a command for on/off control of the identification number generation units 160 and transmits the control command to the service execution unit 140.

The service execution unit 140 distributes the control commands, which the service execution unit 140 received from the system management unit 120, to the identification number generation units 160 arranged in the associated operating systems 200 (S160). As a result, the identification number generation units 160 that have received the respective control commands are activated (S180).

The identification number generation units 160 generate standard identification numbers for electric power facilities managed by the associated operating systems 200 (S200). This step will be described below with reference to FIG. 7.

Each identification number generation unit 160 monitors a database log of the associated operating systems 200 (S210). For example, when a database of the operating systems 200 is built using an Oracle DBMS, the identification number generation unit 160 periodically reads MView log to monitor a database log.

The identification number generation unit 160 retrieves facility information of an electric power facility that is actually in use, on the basis of the database logs (S220). That is, the identification number generation unit 160 detects a change in data from the database log and thus detects an electric power facility that is actually in use. The identification number generation unit 160 retrieves the facility information of the detected electric power facility from the database of the associated operating system 200.

The identification number generation unit 160 converts the data format of the retrieved facility information (S230). That is, the identification number generation unit 160 verifies the data format of the retrieved facility information and converts the data format of the facility information into Unified Architecture (UA) format so that the facility information can be analyzed when the facility information is CIM (IEC61970/61968)-based data.

The identification number generation unit 160 detects an identification number from the format-converted facility information (S240). The identification number generation unit 160 verifies whether the detected identification number is a standard identification number. At this point, the identification number generation unit 160 verifies whether the detected identification number is a standard identification number (Master Resource ID (mRID)) used in Common Information Model (CIM).

When the detected identification number is a non-standard identification number that has a different format from a standard identification number (Yes in Step S250), the identification number generation unit generates a standard identification number on the basis of the detected identification number (S260). At this point, the identification number generation unit 160 generates a standard identification number to replace the non-standard identification number, using a pseudorandom number generation method. For example, the identification number generation unit 160 selects one number from among $2^{128}$ numbers using a Globally Unique Identifier (GUID), and generates a 32-digit standard identification number.

The identification number generation unit 160 stores the generated standard identification number (S270). That is, the identification number generation unit 160 stores and manages the standard identification number that is determined to have a standard format in Step S250 or which is generated in Step S260. At this point, in the case of storing the standard identification number generated in Step S260, the identification number generation unit 160 stores the generated standard identification number such that the generated standard identification number is connected with the detected existing identification number (i.e., non-standard identification number).

The system management unit 120 collects the standard identification numbers generated by the multiple identification number generation units 160 arranged in the respective operating systems 200 (S300). This step will be described below with reference to FIG. 8.

The system management unit 120 generates a control command for collection of the standard identification number (S305) and transmits the control command to the service execution unit 140 (S310).

The service execution unit 140 distributes the control command to the identification number generation units 160 arranged in the associated operating systems 200 (S315). The identification number generation unit 160 retrieves the standard identification number stored therein, according to the control command for collection of a standard identification number, which is distributed by the service execution unit 140, and transmits the retrieved standard identification number to the service execution unit 140. At this point, the identification number generation unit 160 transmits the non-standard identification number (existing identification number) as well as the stored and retried standard identification number when there is the non-standard identification number (existing identification number) mapped on the standard identification number.

When receiving the standard identification number from the identification number generation unit 160 (Yes in Step S320), the service execution unit 140 generates a class diagram of standard identification numbers (S325). That is, the service execution unit 140 investigates association, aggregation, and composition of the standard identification numbers and generates the class diagram before transmitting the standard identification numbers to the system management unit 120.

The service execution unit 140 verifies whether the standard identification numbers are suspected of being erroneous on the basis of the association, aggregation, and composition of the standard identification numbers used to generate the class diagram. Herein, the standard identification number being erroneous means that two or more standard identification numbers are allocated to one electric power facility. When a standard identification number is suspected to be erroneous (Yes in Step S330), the service execution unit 140 verifies the topology configuration of the standard identification number that is suspected of being erroneous (S335), and selects one standard identification number to be changed, from a pair of duplicated standard identification numbers by performing standard information model profile analysis (S340).

The service execution unit 140 determines a time to change the standard identification number. That is, the service execution unit 140 identifies the operating system 200 in which the standard identification number to be changed is stored, and determines the time at which the standard identification number is to be changed, according to characteristics of the relevant operating system 200.

The service execution unit 140 asks the identification number generation unit 160 in the relevant operating system 200 to change the standard identification number when the time comes. At this point, the error verification module 146 transmits an alternative standard identification number along with a change request so that the erroneous standard identification number can be replaced with the alternative standard identification number. Thus, the identification number generation unit 160 replaces the erroneous standard identification number with the received alternative standard identification number (S350).

When it is determined that the change of the standard identification number is finished (Yes in Step S355) after a message of the change request is received from the identification number generation unit 160, the service execution unit 140 transmits the alternative standard identification number to the system management unit 120 (S360). At this point, the service execution unit 140 transmits the standard identification number that is determined to be normal in Step S330 and the standard identification number replaced in Step S350 to the system management unit 120. When there is a non-standard identification number mapped on the standard identification number, the service execution unit 140 also transmits this non-standard identification number along with the standard identification number to the system management unit 120. Next, the system management unit 120 stores the received identification numbers such that the non-standard identification number and the standard identification number are connected with each other.

As described above, the electric power facilities identification number management apparatus and method can generate standard identification numbers for respective electric power facilities and manage the standard identification numbers such that the generated standard identification numbers are connected with existing identification numbers of the electric power facilities, which are differently allocated in each operating system. Therefore, it is possible to solve the problem of inconsistency of facility information of the electric power facilities between the operating systems, resulting in an improvement in reliability of management of electric power facilities and operation of power systems and leading to high efficiency in asset management.

In addition, since the electric power facilities identification number management apparatus and method generate standard identification numbers for respective electric power facilities and manage the standard identification numbers such that the generated standard identification numbers are connected with existing identification numbers of the electric power facilities, which are differently allocated for each operating system, it is possible to associate operating systems with each other, perform comprehensive analysis on electric power domains (transmissions/substations/distributions/sales and demands) and perform continuous linkage analysis on electric power facilities.

In addition, since the electric power facilities identification number management apparatus and method generate standard identification numbers for respective electric power facilities and manage the standard identification numbers such that the generated standard identification numbers are connected with existing identification numbers of the electric power facilities, which are differently allocated for each operating system, it is possible to perform automatic database refining and non-stop service through selective generation of standard identification numbers, efficiently utilize system resources, and minimize a probability of occurrence of problems when identification numbers are changed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electric power facilities identification number management apparatus comprising:
   an identification number generation unit that generates a standard identification number for an electric power facility associated with an operating system when an existing identification number of the electric power facility is a non-standard identification number;
   a system management unit that generates a control command for collection of the standard identification number generated by the identification number generation unit; and
   a service execution unit that collects the standard identification number generated by the identification number generation unit on the basis of the control command generated by the system management unit, verifies the collected standard identification number, and transmits the verified standard identification number to the system management unit.

2. The electric power facilities identification number management apparatus according to claim 1, wherein the identification number generation unit includes:

a detection module that monitors a database of the operating system to detect an electric power facility that is actually in use, and retrieves facility information of the detected electric power facility from the database;

a conversion module that converts a data format of the facility information retrieved by the detection module into Unified Architecture (UA) format when the retrieved facility information is CIM-based data, and detects an identification number from the format-converted facility information;

an identification number generation module that generates a standard identification number using a pseudorandom number generation method when the identification number detected by the conversion module is a non-standard identification number; and an identification number management module that stores the identification numbers such that the standard identification number generated by the identification number generation module is connected with the identification number detected by the conversion module, and transmits the stored standard identification number to the service execution unit when receiving a collection request for the standard identification number from the service execution unit.

3. The electric power facilities identification number management apparatus according to claim 2, wherein when receiving a change request containing a standard identification number that is erroneous and an alternative standard identification number from the service execution to unit, the identification number management module retrieves a standard identification number that is the same as the erroneous standard identification number contained in the change request, from a database thereof, and replaces the retrieved standard identification number with the alternative standard identification number.

4. The electric power facilities identification number management apparatus according to claim 1, wherein the identification number generation unit includes:
an identification number reference module that stores environment setting information including a standard identification number, a transmission period, and a profile; and
a service management module that transmits the standard identification number to an operating system that wants to subscribe to the standard identification number, on the basis of the environment setting information stored in the identification number reference module.

5. The electric power facilities identification number management apparatus according to claim 1, wherein the system management unit includes:
an identification number collection module that transmits a control command for collection of the standard identification number to the service execution unit, to collect the standard identification number; and
a meta data storage module that stores the standard identification number collected by the identification number collection module.

6. The electric power facilities identification number management apparatus according to claim 5, wherein the identification number collection module receives a standard identification number and an existing identification number that is mapped on the standard identification number, from the service execution unit, and wherein the meta data storage module stores the existing identification number and the standard identification number such that the existing identification number and the standard identification number are connected with each other.

7. The electric power facilities identification number management apparatus according to claim 1, wherein the service execution unit includes:
a connection configuration module that investigates association, aggregation, and composition of the standard identification numbers received from the identification number generation units, generates a class diagram on the basis of the investigation results, and determines whether the received standard identification numbers are suspected of being erroneous, the class diagram providing profile information for data service between associated operating systems; and
an error verification module that performs verification, estimation, and reassignment with respect to the standard identification numbers that are determined to be suspected of being erroneous by the connection configuration module.

8. The electric power facilities identification number management apparatus according to claim 7, wherein the connection configuration module determines that the standard identification numbers are suspected of being erroneous when two or more standard identification numbers are allocated to one electric power facility, generates a list of the standard identification numbers suspected of being erroneous, and transits the list to the error verification module.

9. The electric power facilities identification number management apparatus according to claim 7, wherein the error verification module compares the standard identification numbers collected in the service execution unit with the standard identification numbers stored in an associated operating system and verifies an error of the standard identification numbers by checking duplication of the standard identification numbers.

10. The electric power facilities identification number management apparatus according to claim 7, wherein the error verification module selects a standard identification number to be changed from the standard identification numbers determined to be suspected of being erroneous by the connection configuration module, determines a time to change the standard identification number according to characteristics of the operating system in which the standard identification number to be changed is stored, asks the identification number generation unit to change the standard identification, and transmits a change request containing the to-be-changed standard identification number and an alternative standard identification number to the identification number generation unit.

11. An electric power facilities identification number management method comprising the steps of:
by an identification number generation unit, generating a standard identification number for an electric power facility associated with an operating system when an existing identification number of the electric power facility is a non-standard identification number;
by a system management unit, generating a control command for collection of the standard identification number generated by the identification number generation unit; and
by a service execution unit, collecting the standard identification number generated by the identification number generation unit on the basis of the control command generated by the system management unit, verifying the collected standard identification number, and transmitting the verified standard identification number to the system management unit.

12. The electric power facilities identification number management method according to claim 11, wherein the step of generating a standard identification number includes the sub-steps of:
- by the identification number generation unit, monitoring a database log of the associated operating system;
- by the identification number generation unit, retrieving facility information of an electric power facility that is actually in use, on the basis of the monitored database log;
- by the identification number generation unit, verifying whether an identification number detected from the facility information is a standard identification number;
- by the identification number generation unit, generating a standard identification number using a pseudorandom number generation method when the detected identification number is a non-standard identification number; and
- by the identification number generation unit, storing the generated standard identification number.

13. The electric power facilities identification number management method according to claim 12, wherein the step of verifying a standard identification number includes the sub-steps of:
- by the identification number generation unit, converting a data format of the facility information into Unified Architecture (UA) format when the facility information is CIM-based data;
- by the identification number generation unit, detecting an identification number from the format-converted facility information; and
- by the identification number generation unit, verifying whether the identification number detected from the facility information is a standard identification number used in CIM.

14. The electric power facilities identification number management method according to claim 12, wherein the step of storing the standard identification number includes the sub-steps of:
- by the identification number generation unit, storing again the identification number that is determined to be a standard identification number in the step of verifying an identification number.

15. The electric power facilities identification number management method according to claim 12, wherein in the step of storing the standard identification number, the identification number generation unit stores the detected identification number and the generated standard identification number such that the detected identification number is connected with the generated standard identification number.

16. The electric power facilities identification number management method according to claim 11, wherein the step of transmitting the verified standard identification number to the system management unit includes the sub-steps of:
- by the service execution unit, distributing collection requests of the standard identification numbers to the identification number generation units on the basis of the generated control commands;
- by the service execution unit, determining whether the standard identification number received from the identification number generation unit is suspected of being erroneous;
- by the service execution unit, replacing the standard identification number suspected of being erroneous, which is determined in the step of determining whether the standard identification number is suspected of being erroneous, with an alternative standard identification number; and
- by the service execution unit, transmitting the standard identification number that is determined to be normal in the step of determining whether the standard identification number is suspected of being erroneous, and the standard identification number replaced in the step of replacing the standard identification number, to the system management unit.

17. The electric power facilities identification number management method according to claim 16, wherein the step of determining whether the standard identification number is suspected of being erroneous includes the sub-steps of:
- by the service execution unit, investigating association, aggregation, and composition of the standard identification numbers;
- by the service execution unit, determining whether the received standard identification number is suspected of being erroneous on the basis of the investigation results; and
- by the service execution unit, generating a class diagram of the received standard identification numbers on the basis of the investigation results.

18. The electric power facilities identification number management method according to claim 16, wherein in the step of determining whether the standard identification number is suspected of being erroneous, the service execution unit determines that the standard identification number is suspected of being erroneous when two or more standard identification numbers are allocated to one electric power facility.

19. The electric power facilities identification number management method according to claim 16, wherein the step of replacing the standard identification number includes the sub-steps of:
- by the service execution unit, checking a topology configuration of the standard identification number suspected of being erroneous, which is determined in the step of determining whether the standard identification number is suspected of being erroneous;
- by the service execution unit, selecting a standard identification number to be changed from a pair of duplicated standard identification numbers by performing standard information model profile analysis with respect to the standard identification numbers suspected of being erroneous;
- by the service execution unit, determining a time to change the selected standard identification number according to characteristics of the operating system in which the standard identification number to be changed is stored; and
- by the service execution unit, asking the identification number generation unit arranged in the relevant operating system to change the standard identification number when the time comes.

20. The electric power facilities identification number management method according to claim 19, wherein in the step of asking the change of the standard identification number, a change request containing the to-be-changed standard identification number and an alternative standard identification number is transmitted to the identification number generation unit.

* * * * *